June 18, 1968

W. HUGHES 3,389,193

METHOD AND APPARATUS FOR SHAPING A DEFORMED TIRE

Filed Feb. 16, 1966

INVENTOR.
Walton Hughes
BY
W. S. Pettigrew
ATTORNEY

June 18, 1968 W. HUGHES 3,389,193
METHOD AND APPARATUS FOR SHAPING A DEFORMED TIRE
Filed Feb. 16, 1966 3 Sheets-Sheet 2

INVENTOR.
Walton Hughes
BY
W.S. Pettigrew
ATTORNEY

June 18, 1968          W. HUGHES          3,389,193
METHOD AND APPARATUS FOR SHAPING A DEFORMED TIRE
Filed Feb. 16, 1966          3 Sheets-Sheet 3
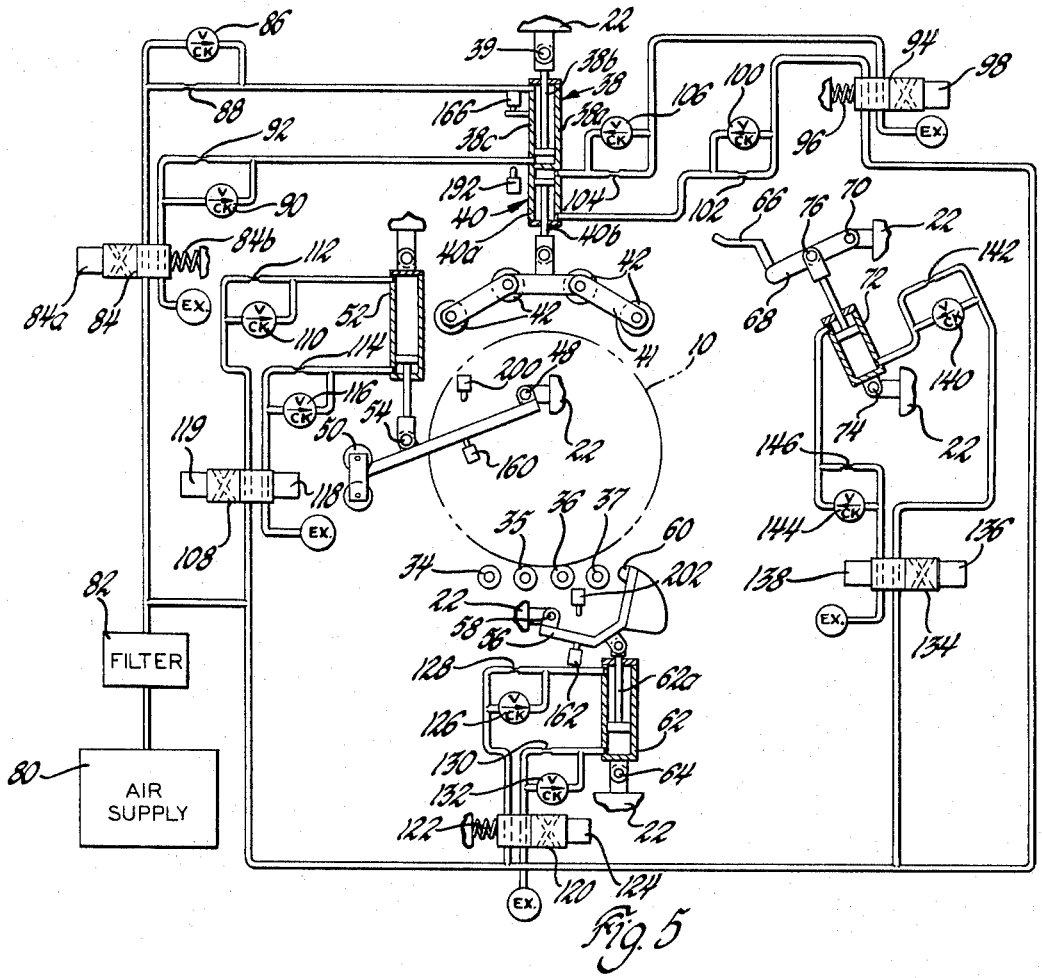
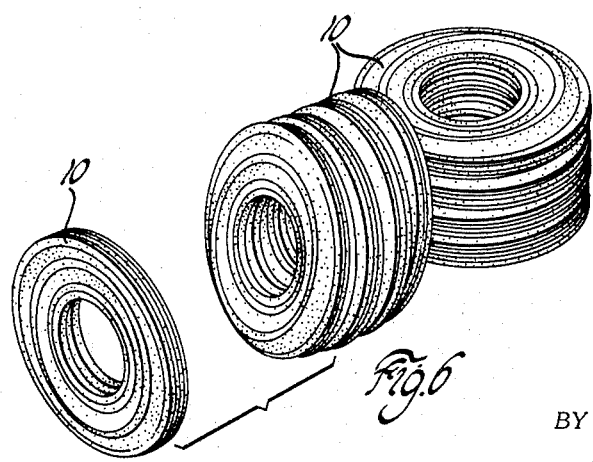
INVENTOR.
Walton Hughes
BY
W.S. Pettigrew
ATTORNEY

United States Patent Office 3,389,193
Patented June 18, 1968

3,389,193
METHOD AND APPARATUS FOR SHAPING A DEFORMED TIRE
Walton Hughes, Scotch Plains, N.J., assignor to General Motors Corporation, Detroit, Mich., a corporation of Delaware
Filed Feb. 16, 1966, Ser. No. 527,813
6 Claims. (Cl. 264—36)

This invention relates to a method and apparatus for shaping a deformed tire and, more particularly, to a method and apparatus for restoring to its normal toroidal shape, a vehicle tire which has been deformed or distorted from its normal shape.

One feature of the invention is that it provides an improved tire shaping method and apparatus. Another feature of the invention is that it provides a method and apparatus in which a rotating tire is supported at circumferentially spaced places, pressure is applied to the tire to cause the tread to buckle inwardly between the spaced supports, and the buckling action is used as a control to release the pressure upon occurrence of buckling. Still another feature of the invention is that cyclical means are provided for reapplying pressure upon cessation of buckling between the spaced supports.

Other features and advantages of the invention will be apparent from the following specification and drawings in which:

FIGURE 5 is a diagrammatic representation of the tire shaping apparatus and its operating means; and FIGURE 6 is an isometric view of a broken bundle of tires showing how the tires may be deformed in shipment.

It has been conventional practice to ship automobile tires from their place of manufacture to an automobile assembly plant in a freight car or other vehicle, the tires being stored in the vehicle in piles extending from the floor to adjacent the ceiling and the tires being arranged in each pile in interlocked relationship with a circumferential portion of one or two tires being wedged into the center opening of a supporting tire, this interlocking arrangement continuing through a stack of 25 or more tires. More recently, it has been proposed to ship tires in tightly compressed bundles, a group of about 15 tires being arranged one on top of the other and the whole bundle being compressed and tied securely together with steel bands. In either shipping arrangement, the tires become twisted and deformed from their normal toroidal shape to an extent where they must be reshaped before they can be mounted on a vehicle. FIGURE 6 shows a broken bundle of tires after removal of the steel bands, and it may readily be seen that the tires are misshapen and deformed to such an extent that the bead portions on opposite sides of some of the tires actually touch. Before the tires are mounted on the automobile or other vehicle for which they are intended, it is necessary to reshape them into their normal toroidal shape.

Attempts have heretofore been made to reshape the tire by means of heating, but this process is too slow and, in any event, results only in partial recovery of a badly deformed tire. It has also been attempted to shape the tire by rotating the tire and, at the same time, applying pressure in a radial direction on the tread portion thereof. Machines designed for this purpose have been only partially successful because, upon the application of sufficient pressure, the tread of the rotating tire buckles inwardly and, upon the buckle reaching a critical point, the tire will collapse and jam in the tire shaping machine.

I have invented an improved method and apparatus for shaping a deformed tire wherein the buckling action of the tire is sensed immediately upon its occurrence. The pressure which caused the buckle is controlled by the sensing means and is released immediately upon the occurrence of the buckle before the tire can collapse and jam the machine. Preferably, the machine is arranged to cycle so that the pressure is reapplied through one or more cycles upon cessation of buckling.

Figure 1:
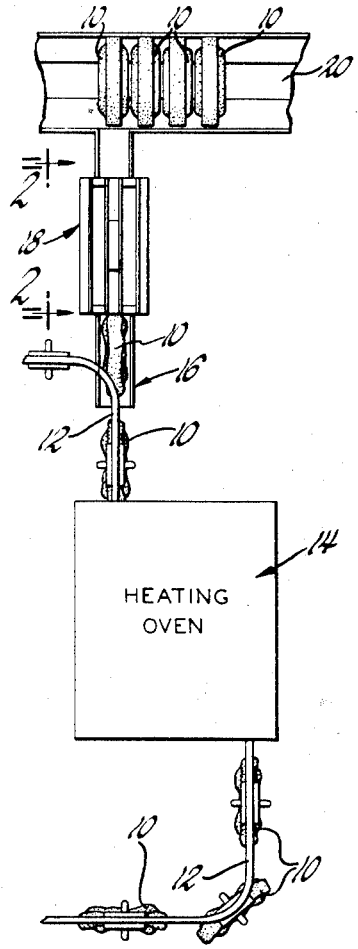
FIGURE 1 is a plan view showing elements of a tire handling system including the improved tire shaping apparatus.

Referring now more particularly to the drawings, as pointed out above, FIGURE 6 shows a broken bundle of tires 10 which were shipped in a compressed bundle which was tied with steel tape, the tape having been removed in FIGURE 6. Because the tires were compressed in the bundle, each tire 10 has become twisted and deformed. Referring to FIGURE 1, after the bundle has been opened, the tires are loaded individually in sequence on a conveyor 12 which passes through an oven 14. The temperature in the oven preferably is about 175° F. and the conveyor 12 may pass through a torturous path in the oven so that each tire remains in the oven for about 10 minutes and reaches a temperature of about 135° F. by the time it emerges from the oven. The conveyor 12 then passes by an unloading stage 16 where each tire is unloaded from the conveyor and passed into a tire shaping machine designated generally as 18. At the completion of the tire shaping cycle, each tire passes out of the machine 18 onto a conveyor 20 which carries it toward the tire mounting stage, not shown.

Figure 2:
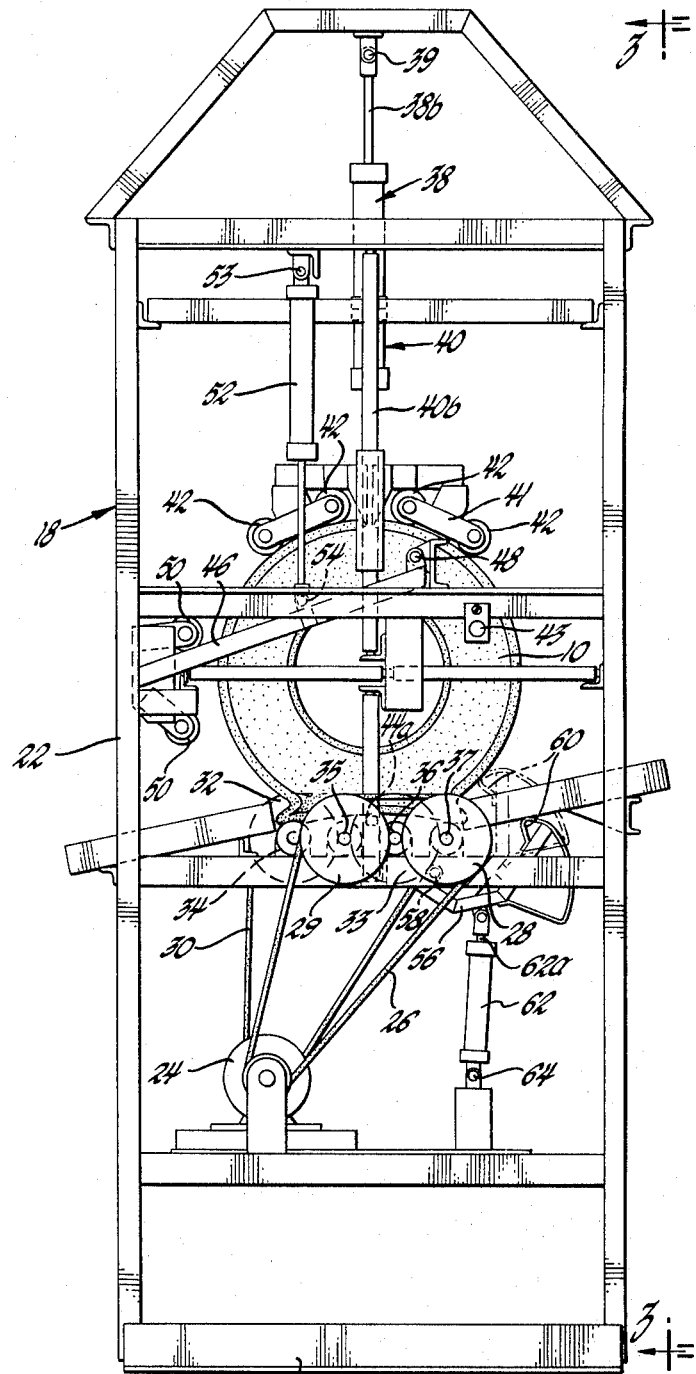
FIGURE 2 is an enlarged side elevation of the tire shaping apparatus, looking along the line 2—2 of FIGURE 1.
Figure 3:
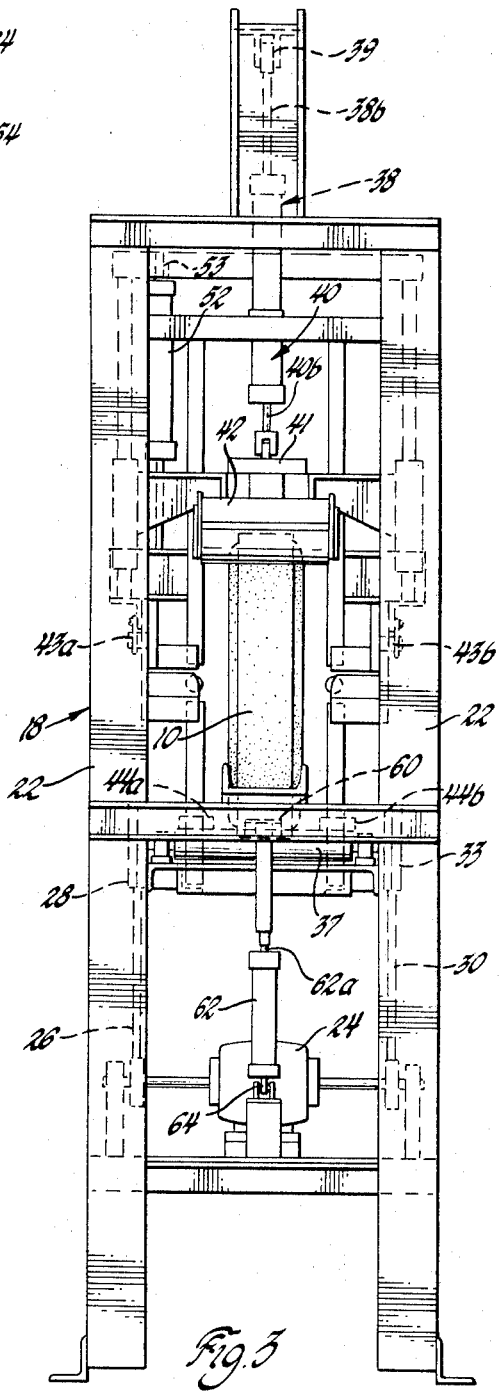
FIGURE 3 is an end view of the tire shaping apparatus, looking along the line 3—3 of FIGURE 2.

The tire shaping machine 18 is shown in FIGURES 2 and 3 and its essential parts and mode of operation are shown diagrammatically in FIGURE 5. The machine includes a frame 22 upon which is mounted a drive motor 24 connected by a first drive belt 26 to first drive pulleys 28 and 29, and connected by a second drive belt to second drive pulleys 32 and 33. The shafts of the respective drive pulleys 28, 29, 32, and 33 mount drive rollers 34, 35, 36, 37, which rotatably support a tire in the machine. As seen best in FIGURE 5, the tire is supported on its tread at circumferentially spaced places, resting on the spaced rollers 35 and 36.

Mounted above the support rollers and generally opposite the support location is a pressure applying means comprising a main piston and cylinder device 38 having a cylinder 38a and a piston and piston rod 38b. The device illustrated has an 8 inch stroke and for convenience this device is designated as the 8 inch cylinder. The piston rod 38b of the main piston and cylinder device is pivotally mounted on the machine frame at 39. Mounted on the lower end of the 8 inch cylinder is an auxiliary piston and cylinder device 40 having a cylinder 40a and a piston and piston rod 40b which, in the machine illustrated, may have a stroke of 2½ inches. For convenience, this device is designated as the 2½ inch cylinder. The piston rod 40b of the 2½ inch cylinder carries at its lower end a roller support bracket 41 which mounts four idler pressure rollers 42. As shown in FIGURE 2, these rollers are arranged to apply pressure to the tire along a substantial circumferential extent thereof at a location generally opposite the support location and in a direction to flatten the tread to cause the tire tread to buckle inwardly between the spaced supports 35 and 36. The cylinder of the 8 inch cylinder 38 is movable between the upper inoperative position of FIGURE 5 and the lower operative position of FIGURE 2. The pressure rollers 42 are movable between a retracted or inoperative position and an extended or pressure-applying position wherein the piston rod 40b is extended while the 8 inch cylinder 38 is in its operative position.

In order to sense when a tire is in the machine, an electric eye is provided comprising a source 43a of a beam of light on one side of the tire and a light sensitive pickup device 43b on the other side of the tire. When a tire is in place in the machine, the beam is broken and a signal is developed to start the cycle of operation. A second electric eye is provided for sensing a buckling action in the tire during the shaping operation. This electric eye includes a device 44a on one side of the tire for developing a beam of light and a light sensitive pickup device 44b on the other side of the tire, the beam projecting onto the tire near the periphery thereof in the space between the rollers 35 and 36 so that, when the tire tread buckles inwardly in the space between the rollers 35 and 36, the light sensitive pickup device is actuated to sense the buckle.

A stop device comprises stop arms 46 pivotally mounted on the machine frame at 48 and carrying on their free end a pair of stop rollers 50. A piston and cylinder actuator 52 is pivotally mounted on the machine frame at 53 and is pivotally connected at 54 to the stop arm 46 so that the stop rollers 50 may be swung between an upper out-of-the-way position and a lower tire-stopping position as illustrated in FIGURES 2 and 5 wherein a tire 10 is prevented from rolling out of the machine.

A pusher device to eject the tire from the machine comprises an arm 56 which is pivotally mounted at 58 on the machine frame and which, at its free end, carries a pusher 60. A piston and cylinder device 62 is pivotally mounted at 64 on the machine frame and the piston rod 62a of this device is articulated to the pusher arm 56 so that the pusher arm can be swung between the inoperative position shown in FIGURES 2 and 5 and an operative position wherein, when the stop rollers 50 are raised, it ejects the tire from the machine at the completion of the shaping cycle.

A tire is introduced into the machine by means of a lifter 66 which is rigidly affixed to a lifter arm 68 pivoted at 70 on the machine frame. An actuator for the lifter comprises a piston and cylinder device 72 which is pivotally mounted on the machine frame at 74 and which is connected to the lifter arm 68 at 76. Upon actuation, the lifter swings up to pick a tire from a support hook on the conveyor 12 and then swings down to allow the tire to roll into the machine after the support hook has moved out of the way.

The operating means for the machine, as illustrated, is pneumatic, although hydraulic or electric means could be utilized. In the operating arrangement shown in FIGURE 5, air under pressure from a source of supply 80 is connected to the machine through a filter 82. The air supply for operating the 8 inch cylinder 38 extends from the filtered air supply through a reversing valve 84 which is operated in one direction by a solenoid 84a and in the other direction by a spring 84b. Between the valve 84 and the upper chamber of the cylinder 38 is a check valve 86 bypassed by a restrictor 88, and similarly between the exhaust passage of the valve 84 and the lower chamber of the cylinder 38 is a check valve 90 bypassed by a restrictor 92. When the reversing valve 84 is in the position shown in FIGURE 5, being held in that position by the spring 84b, its connections between the air supply and the cylinder 38 are as indicated by dotted lines in the valve body; that is, air under pressure is delivered through the check valve 86 to the upper chamber of the cylinder 38 and the pressure rollers 42 are held in their upper or inoperative position. The lower chamber of the cylinder 38 is connected to exhaust through the restrictor 92 and the valve 84. When the solenoid 84a is energized, the valve is reversed, air under pressure being connected through the check valve 90 to the lower chamber of the cylinder 38 and the upper chamber of said cylinder being connected through the restrictor 88 and the valve 84 to exhaust.

The 2½ inch cylinder, which is mounted on the lower end of the 8 inch cylinder, is connected to the filtered air supply through a reversing valve 94 which is held in the position shown by a spring 96 and which may be operated to its reverse position by energization of a solenoid 98. In the relationship shown in FIGURE 5, air under pressure is delivered to the lower chamber of the cylinder 40 to retract the pressure rollers 42, the air passing from the filtered air supply through the valve 94 and through a check valve 100 which is bypassed by a restrictor 102. The upper chamber of the cylinder 40 is open to exhaust through a restrictor 104 and the valve 94. If the solenoid 98 is energized, the valve 94 is reversed so that the upper chamber of the cylinder 40 is connected to the air supply through a check valve 106 which bypasses the restrictor 104 and through the valve 94. Under these conditions, the lower chamber of the cylinder 40 is connected to exhaust through the restrictor 102 and the valve 94.

In order to hold the stop rollers 50 in their operative position as shown, air under pressure is delivered to the upper chamber of cylinder 52 through a reversing valve 108 and a check valve 110 which is bypassed by a restrictor 112. Under this condition of operation, the lower chamber of the cylinder 52 is connected to exhaust through a restrictor 114 which is bypassed by a check valve 116 and through the valve 108. The valve 108 is moved to the operating position shown by a solenoid 118 and is moved to its up or inoperative position by a solenoid 119. When the solenoid 119 is energized, the valve 108 is reversed so that the lower chamber of the cylinder 52 is connected to pressure through the check valve 116 and the solenoid valve 108 and the upper chamber of the cylinder 52 is connected to exhaust through the restrictor 112 and the valve 108.

The pusher 60 is controlled by a reversing valve 120 which is spring operated to its retracted position by means of spring 122 and is solenoid operated to its forward or operative position by a solenoid 124. In the retracted position shown in FIGURE 5, air under pressure is delivered to the upper chamber of the cylinder 62 through the valve 120 and through a check valve 126 which is bypassed by a restrictor 128. The lower chamber of the cylinder 62 is connected to exhaust through a restrictor 130 and through the valve 120. If the solenoid 124 is energized, the connections of the valve 120 are reversed so that the lower chamber of the cylinder 62 is connected to pressure through a check valve 132 which bypasses the restrictor 130, and the upper chamber of the cylinder 62 is connected to exhaust through the restrictor 128 and the valve 120.

The lift arm 66 is controlled by means of a reversing valve 134 having a solenoid 136 to operate it in one direction and a solenoid 138 to operate it in the other direction. In the position shown in FIGURE 5, the lift arm 66 is in its up position. Solenoid 138 is energized and air under pressure is delivered to the lower chamber of the cylinder 72 through the valve 134 and through a check valve 140 which is bypassed by a restrictor 142. In order to move the lift arm 66 to its lower position, solenoid 138 is deenergized and solenoid 136 is energized. This reverses the valve 134 so that air under pressure is delivered to the upper chamber of the cylinder 172 through a check valve 144 which is bypassed by a restrictor 146.

Figure 4:
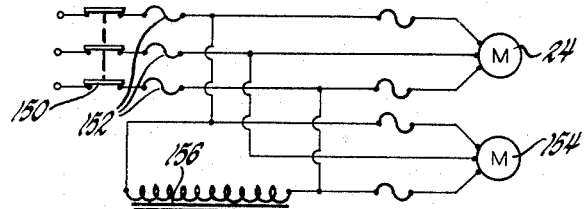
FIGURE 4 is a schematic wiring diagram of the operating and control circuits for the tire shaping apparatus.
Figure 4:
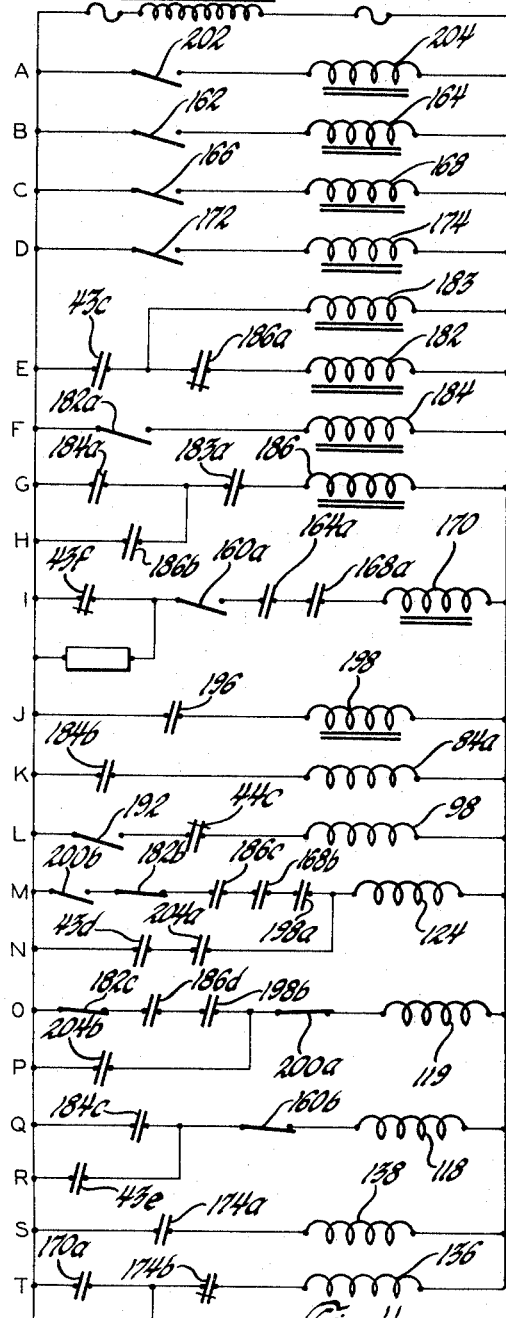

The control circuit for the machine and the mode of operation thereof will be explained with particular reference to FIGURES 4 and 5. The machine is designed to rotate the tire while supporting it on its tread at circumferentially spaced places. Pressure is applied to the tire along a substantial circumferential extent thereof at a location generally opposite the support location and in a direction to flatten the tread to cause the tread to buckle inwardly between the spaced supports, and the electric eye 44 senses the buckling action upon its occurrence and acts to release the pressure before the buckle can cause the tire to collapse and jam in the machine. The machine is designed to reapply the pressure and operate through a number of cycles over a predetermined time period, as seven seconds. At the end of the time period, the tire is ejected from the machine.

In order to operate the machine, a source of voltage, preferably a 440 volt, 60 cycle, 3-phase voltage, is provided and is controlled by manually operated ganged switches 150, conventional fuses 152 being connected into the 3-phase line. The drive motor 24, which operates the support rollers 34–37, is connected to the source of voltage through conventional fuses and a second motor 154 which drives the conveyor 12 is also connected into the line. The line voltage is reduced by means of a transformer 156 so that the control circuit operates at a lesser voltage, preferably 110 volts. In FIGURE 4, the lines of the "across-the-line" wiring diagram on the low voltage side of the transformer have been identified by the letters A–V to facilitate locating the circuit components.

When the machine 18 is ready to accept a tire, the motor 24 is driving the support rollers 34, 35, 36, and 37 at such a speed that an automobile tire supported thereon will be rotated at about 60 r.p.m. The stop arm 46 is down, operating switch 160 to close contacts 160a (line I) and to open switch contacts 160b (line Q); the pusher 60 is retracted, operating switch 162 to close its contacts 162 (line B), energizing relay coil 164 (line B) so that its associated switch 164a (line I) closes. The 8 inch cylinder 38 is up, closing switch 166 (line C) which energizes relay 168 (line C) and its switches 168a (line I) and 168b (line M) close. Electric eye 43 is not actuated, indicating that no tire is present in the shaping machine, and the switches it controls, 43c (line E) and 43d (line N) are open, while switches 43e (line R) and 43f (line I) are closed. Relay 170 (line I) is energized since switches 43f, 160a, 164a, and 168a all are closed. When relay 170 is energized, its controls 170a (line T), close.

A tire on the conveyor 12 moves into the unload position and the lift arm 66 lifts it off the conveyor hook. The tire, when in the unload position, closes switch 172 (line D) which energizes relay 174 (line D) so that its associated switch 174a (line S) closes and its associated switch 174b (line T) opens. Closure of switch 174a energizes the lift-up solenoid 138 (line S) so that the valve 134 is reversed and the tire is lifted off of the conveyor and the empty hook of the conveyor leaves the unload position, permitting lift arm 66 to lower and allow the tire to roll into the shaping machine. After the empty hook of the conveyor leaves the load position, switch 172 (line D) is opened, deenergizing relay 174 (line D). This opens the associated relay switch 174a (line S) and closes the associated relay switch 174b (line T), deenergizing the lift-up solenoid 138 and energizing the lift-down solenoid 136 (line T). The tire now rolls off the lift 66 into the shaping machine and the 8 inch cylinder lowers. As the tire enters the shaping machine, it blocks the beam from electric eye 43 so that switches 43c and 43d close, while switches 43e and 43f open. Closure of switch 43c energizes a time cycle relay 182 (line E) and also a parallel connected relay 183 (line E) having associated therewith normally open contacts 183a (line G). Upon energization of relay 182, its associated switch contacts 182a (line F) close and its normally closed switch contacts 182b (line M) and 182c (line O) open. Closure of contacts 182a energizes an auxiliary time relay 184 (line F) to close its associated switch contacts 184a (line G), 184b (line K), and 184c (line Q). Upon closure of time relay contacts 184a, relay 186 (line G) is energized, opening its associated contacts 186a (line E), closing its associated contacts 186b (line H), closing its associated contacts 186c (line M), and closing its associated contacts 186d (line O). Closure of contacts 186b holds relay 186 energized so long as switch 183a is closed. Closure of relay contacts 184b energizes the solenoid 84a (line K) which drives the 8 inch cylinder 38 down to its lower position where its switch actuating arm 38b closes switch 192 (line L). The cylinder 38, of course, carries with it the 2½ inch cylinder 40. Closing switch 192 energizes solenoid 98 (line L) and the piston rod 40b of cylinder 40 is extended to further lower the pressure rollers 42 and apply pressure to the tire along a substantial circumferential extent thereof at a location generally opposite the support location (drive rollers 35, 36) and in a direction to flatten the tread of the tire to cause the tread to buckle inwardly between the spaced supports 35, 36.

Electric eye 44 is not actuated when the tire is located on the rollers 35, 36 so long as there is no inward buckle in the tread between these rollers since the tread of the tire blocks the beam of the electric eye. Under this condition, switch contacts 44c (line L), which are controlled by the electric eye 44, are closed. Since switch 192 (line L) was closed mechanically by the actuating arm 38c on the 8 inch cylinder 38 when this cylinder reached its lower position, the solenoid 98 (line L) was energized, reversing the valve 94 and driving the piston rod 40b towards its extended position, thereby causing rollers 42 to apply pressure to the tire. When sufficient pressure is applied, the tread commences to buckle inwardly between the spaced support rollers 35 and 36. This buckle is sensed immediately by the electric eye 44 before the rotating tire has a chance to collapse and jam in the machine because, as soon as the buckle appears, the electric eye 44 is actuated and the electric eye switch contacts 44c open, deenergizing the solenoid 98 so that the pressure on the tire is instantly removed as the spring 96 reverses the valve 94 to admit air under pressure into the lower chamber of the cylinder 40 and retract the rollers 42. As soon as the buckle disappears in the tire, the electric eye 44 is again deenergized, closing switch 44c and reenergizing solenoid 98 so that, upon cessation of buckling of the tread between the spaced supports, and until the time relays 182 and 184 drop out, pressure is cyclicly reapplied to the tire.

At the end of their preset delay period, relays 182 and 184 drop out, opening switch 184b and deenergizing the relay 84a which holds the 8 inch cylinder 38 down. Spring 84b takes over and reverses the valve 84 so that the cylinder 38 is raised and the rollers 42 are moved up to their retracted position.

A switch 196 (line J) is on the conveyor 20 for providing a signal when the conveyor 20 is empty and is ready to receive a tire from the tire shaping machine. Switch 196 closes when the conveyor 20 is empty, energizing a relay 198 (line J). Energization of this relay closes its associated contacts 198a (line M), 198b (line O), and 198c (line V). Closure of switch 198b energizes solenoid 119 (line O) which reverses valve 108 and moves the stop arm 46 to its up position where it contacts and operates a switch 200 having normally closed contacts 200a (line O) and normally open contacts 200b (line M). Closure of switch 200b causes energization of the solenoid 124 (line M) which reverses the valve 120 and causes the pusher 60 to be driven forward to eject the tire 10 from the machine and to close switch 202 (line A). Closure of switch 202 energizes relay 204 (line A), closing its normally open holding contacts 204a (line N) and 204b (line P). When the tire leaves the machine, electric eye 43 is energized, causing its contacts 43d (line N) to open, thereby deenergizing solenoid 124 (line M). Contacts 43e (line R) of electric eye 43 close, energizing solenoid 118 which causes valve 108 to reverse and move the stop arm 46 down to its tire blocking position. In this position, the arm 46 engages and opens switch 160a (line I) and closes contacts 160b (line Q) so that the machine is ready for another cycle of operation.

While I have shown and described one embodiment of my invention, it is capable of many modifications. Changes, therefore, in the construction and arrangement

I claim:

1. The method of shaping a deformed tire, comprising: rotating the tire about its normal axis; supporting the rotating tire on its tread at circumferentially spaced places; applying pressure to the tire at a location generally opposite the support location and in a direction to flatten the tread to cause the tread to buckle inwardly between the spaced supports; sensing the buckling action upon its occurrence; and releasing the pressure upon occurrence of buckling.

2. The method of shaping a deformed tire as set forth in claim 1, including the preliminary step of heating the tire.

3. The method of claim 2, further characterized in that the tire is heated to a temperature of the order of 135° F.

4. The method of shaping a deformed tire as set forth in claim 1, characterized in that the tire is rotated at a speed of the order of 60 r.p.m.

5. The method of shaping a deformed tire as set forth in claim 1, including the step of reapplying pressure upon cessation of buckling between the supports.

6. Apparatus for shaping a deformed tire, comprising: means for heating the deformed tire; means for rotating the heated tire about its normal axis; means for supporting the rotating tire on its tread at circumferentially spaced places; means for applying pressure to the tire along a substantial circumferential extent thereof at a location generally opposite the support location and in a direction to flatten the tread to cause the tread to buckle inwardly between the spaced supports; means for sensing the buckling action upon its occurrence, including a light sensitive device so located that its actuating beam passes through the space created by the buckle; means controlled by said sensing means for releasing the pressure upon the occurrence of buckling; and cycling means for reapplying pressure upon cessation of buckling between the spaced supports.

No references cited.

ROBERT F. WHITE, *Primary Examiner.*

T. J. CARVIS, *Assistant Examiner.*